Sept. 25, 1956     G. C. LEMLEY     2,764,332
AUTOMOBILE CLOTHES POST
Filed April 5, 1954
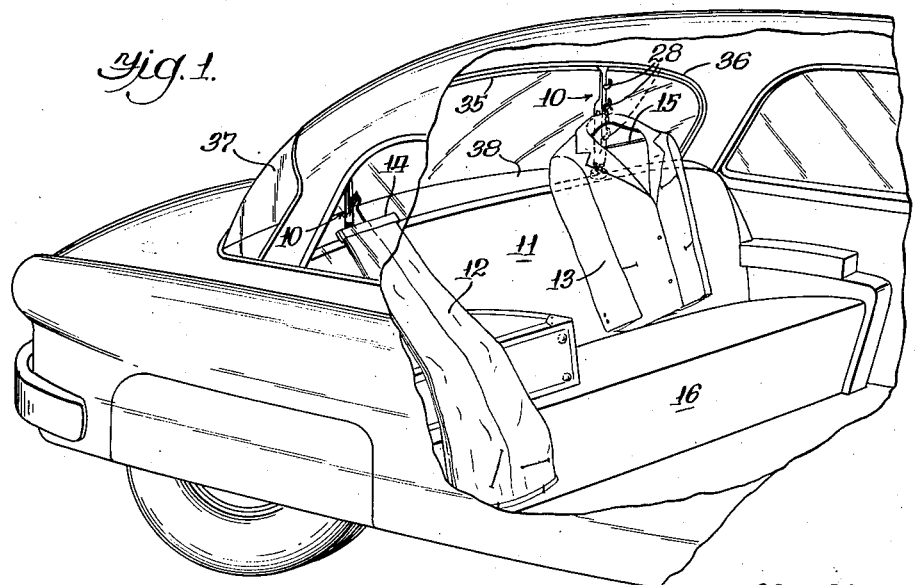
Fig. 1.
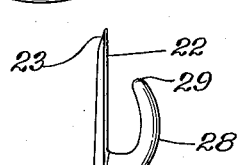
Fig. 2.
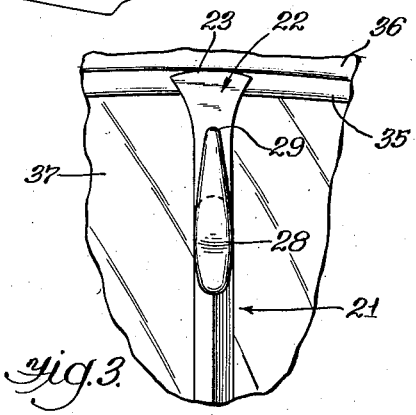
Fig. 3.
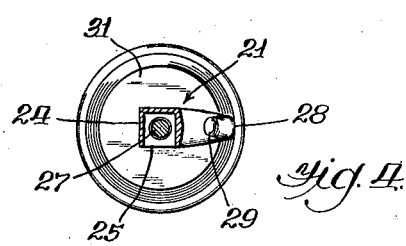
Fig. 4.
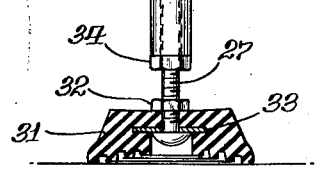
INVENTOR.
Grover C. Lemley
BY
L. F. Hammand   Atty.

ably the hangers are wholly or partially supported by the window glass itself, and necessarily interfere with the convenient operation of the windows, as well as creating a risk of chipping or breaking the glass.

United States Patent Office 2,764,332
Patented Sept. 25, 1956

2,764,332
AUTOMOBILE CLOTHES POST

Grover C. Lemley, Madison, Wis., assignor to Richlite Manufacturing Company, Chicago, Ill., a co-partnership Application April 5, 1954, Serial No. 420,860

1 Claim. (Cl. 224—42.45)

This invention relates to clothes hangers for passenger automobiles, and has as its general aim the provision of an improved device whereby articles of wearing apparel may be hung in the rear seat of a conventional passenger automobile.

The applicant is, of course, aware that there have been many and various types of clothes hangers designed specifically for use in passenger automobiles, but it appears that so far as the known patented and commercial art is concerned, the types of hangers heretofore developed have had certain inherent shortcomings or practical disadvantages of sufficiently serious proportions so that they have not been entirely satisfactory for the intended purposes, and as a consequence have never come into very general or widespread use.

It is therefore the primary aim of the present invention to provide a clothes hanger suitable for installation in a conventional passenger automobile, wherein the hanger is so designed as to provide an adequate and satisfactory means for hanging garments in the vehicle, yet to avoid the many disadvantages inherent in prior types of hangers, and to provide a generally more usable and desirable structure than heretofore known.

More specifically, it is an object of the present invention to provide a clothes hanger wherein the garments are conveniently accessible, yet in an out-of-the-way position which will not interfere with the comfort or vision of the driver, and wherein various other conflicting requirements are successfully reconciled so that various advantageous features may be availed of without the corresponding disadvantages commonly encountered in prior art devices. Thus, it is among the objects of the present invention to provide a clothes hanger assembly so designed that it is suited to interchangeable installation in almost all of the various makes, models and body styles of automobiles presently in common use in the United States. Another object of prime importance in the accomplishment of the general aims of this invention is the provision of a clothes hanger for passenger automobiles which is of a mechanical design and construction, such that it may be installed in a passenger automobile by means rendering its installation rigid and firm, yet not permanent, so that it may be installed and removed at will, or changed from one vehicle to another when desired.

A further object of the invention is the provision of an automobile clothes hanger so designed and arranged that it may be installed in a conventional passenger automobile without in any way scraping, marring or permanently marking the supporting surfaces within the vehicle, and without in any way touching or hindering the operation of the glass of the windshields, windows, etc. This is in sharp contrast to the construction and principles of operation of a great many clothes hangers heretofore proposed, wherein the hangers are wholly or partially supported by the window glass itself, and necessarily interfere with the convenient operation of the windows, as well as creating a risk of chipping or breaking the glass.

Another object of the invention is to provide an automobile clothes hanger of such design and construction that it may be quickly, easily and conveniently mounted in position by any automobile owner, without requiring any particular skill or any special tools for installation. Additional objects are the provision of an automobile clothes hanger so designed as to be neat and attractively styled, yet unobtrusive in appearance so that it will not be particularly noticeable in the vehicle when not in use, and to provide a clothes hanger wherein the exposed parts of the device are streamlined and smoothly contoured so that it is not only attractive in appearance, but devoid of any sharp edges or pointed projections which could cause injury to passengers in case of accident, so as to be entirely safe in use.

A still further object of the invention is to provide an automobile clothes hanger of unique mechanical design, such that it lends itself to commercial mass production methods of manufacture in an unusually attractive manner. This involves the provision of a hanger assembly wherein the several coacting parts of the assembly are so designed and so related to each other that all but one of the component parts required for the complete assembly are standard stock items of hardware, conveniently available on the open market. It also involves the design of the principal structural member of the device such that it is well adapted to commercial methods of die casting, so that the entire assembly may be produced in quantity with a nominal investment for inventory, and without undue expense for the special tools required for its manufacture.

All of the foregoing objects are accomplished by a clothes hanger constructed in accordance with the disclosure herein as illustrated in the attached drawing, wherein:

Figure 1 is a fragmental view showing a pair of clothes hangers as contemplated by this invention installed in a conventional type of passenger automobile;

Figure 2 is a detail side elevational view of the clothes post assembly, shown partly in section for greater clarity;

Figure 3 is a fragmental front elevational view showing the manner of mounting the uppermost end of the clothes post in position with respect to the rear window trim of a conventional automobile; and Figure 4 is a detail plan sectional view through the channel portion of the main vertical member, the view being taken substantially on the plane of the line 4—4 of Figure 2.

The clothes hanger disclosed herein consists of an upright assembly or clothes post adapted to have its lowermost end supported upon the rear window shelf of a conventional passenger automobile, with its upper end supported on the window trim adjacent to but spaced away from the edge of the glass. Thus, as illustrated in Figure 1, the clothes post assemblies generally designated at 10 are in an out-of-the-way position sufficiently rearwardly of the back seat cushion 11 so as to be practically unnoticeable in the vehicle when not in use, yet they provide means upon which garments such as indicated at 12 and 13 may be conveniently supported as by hangers 14 and 15.

As seen in Figure 1, a short garment such as a suit or coat may be supported on the post 10 in such a manner as to hang flat against the back cushion 11 of the seat, while longer garments such as the trousers 12 may be draped forwardly over the rear seat 16. In either case the garments lie against the upholstery of the seat or seat back in such a manner that they are not apt to be blown about, wrinkled or dislodged from their hangers by wind or air currents even though the automobile may be traveling at high speed with the windows open. Moreover, it is to be noticed that the post assemblies 10 are so mounted as to cause no interference with the operation of the windows or doors of the vehicle, and are in such a position that they do not materially hamper the driver's rear view vision even when garments are in place on the hanger hooks.

The clothes post assembly 10 is illustrated in detail in Figures 2, 3 and 4 of the drawings. The main upright member 21 of the assembly consists of a relatively thin flat upper portion having its upper end flared outwardly into a broad flat mounting flange 22 terminating in a convex, wedge-shaped edge or tip 23. The central or intermediate portion of the member 21 is a three-sided channel 24 (Figure 4) which has a central recess 25 open at one side so that the device can be conveniently and economically manufactured by commercial die casting equipment. The lowermost end of the member 21 comprises a fairly long, slender tubular portion 26 having a central cylindrical bore adapted to fit in loosely telescoping relationship over a threaded upright bolt 27, which may extend entirely through the tubular portion 26 and well into the recess 25 of the channel portion 24.

It is to be noted, however, that the member 21 is of integral construction, and is streamlined and smoothly contoured throughout so as to present a neat and attractive, yet unobtrusive, appearance. It is provided with a plurality of integral hooks 28 vertically spaced from each other, and these hooks are also designed so as to present no sharp edges. To this end, the extreme end portions 29 of the hooks are curved inwardly toward the column 21. This not only avoids sharp edges in the assembly, but results in a construction such that garments or hangers will not be apt to be dislodged from the hooks by reason of jolting or jarring of the vehicle in motion.

The vertical screw 27 of the assembly is preferably in the form of a standard threaded stove bolt, provided with a circular rubber foot 31 at its lower end. A nut 32 holds the foot in place. The foot 31 may be a stock item, such as are available on the market in various styles, types and sizes. Preferably, the foot 31 has an internal metallic reinforcing washer 33. A tightening nut 34 completes the assembly, the nut 34 being arranged to be threaded upwardly upon the screw 27 and to bear against the lowermost end of the tubular portion 26 of the column 21. Thus, by tightening the nut 34 upwardly, the assembly may be clamped in position within the vehicle.

It is of importance that the clothes post assembly be held in its position quite firmly and rigidly, in order to adequately support the garments which may be suspended upon it. It is equally essential that it may be installed without permanently marking or defacing the surfaces of the automobile. Moreover, it should be entirely free of any tendency to loosen, rattle, creep or change position after its original installation. These aims are accomplished in the present invention by the mounting here disclosed, which may be firmly clamped, yet which is to a degree yieldable and resilient.

The assembly is installed by inserting the thin, wedge-shaped upper end tip 23 between the rubber gasket 35 of the rear window and the garnish molding 36 thereof, of a conventional automobile. Thus, while the uppermost end of the post 10 is positioned quite close to the rear window 37, yet the metal member 31 is not in contact with the glass and, as a consequence, there is no danger of chipping or breaking the glass, even though the post may be tightened to a greater degree than necessary for adequate installation. The rubber foot 31 is positioned upon a relatively smooth, flat upper surface 38 of the back shelf of the vehicle, and the nut 34 is tightened upwardly against the lowermost end of the tube 26 to complete the installation.

It will be seen from Figure 2 that the mounting of the lowermost end of the screw threaded bolt 27 in the resilient foot portion 31 is such that there is considerable yieldability between the screw and the bottom contacting surfaces of the foot, so that when the device is tightened between the surfaces of the back shelf and the window trim, it will nevertheless not be positively clamped or wedged, but will have sufficient inherent resiliency as to yield sufficiently to accommodate any minor bending or flexing which the vehicle body may undergo in motion. Thus, the screw 27 and nut 34 are held in constant yieldable tension against the lower end of the upright column 21, so that these parts are self-locking with respect to each other and will not tend to vibrate loose or come unfastened. The lowermost end of the screw 27 is locked against rotation by the broad surface engagement between the lower face of the rubber foot 31 and the upper surface of the rear shelf 38 of the vehicle, and the engagement of the flat upper end of the column between the two strips of the window trim prevents relative rotary movement of the column so that the assembly will not loosen except by deliberate downward manipulation of the nut 34.

From the above it will be apparent that the teachings of the present invention provide a highly satisfactory clothes hanger for automotive installations, yet accomplish this desirable result with a mechanical design such that four of the five component pieces of the assembly may be purchased as standard items of hardware, and the entire assembly may be manufactured and made available for merchandising merely by the acquisition of a die casting die of suitable form and configuration to produce the integral column 21. Notwithstanding this, the hanger constructed in accordance with these teachings has features which are of considerable practical advantage over any types of hangers heretofore proposed for automotive use, particularly as to the accomplishment of the various objects enumerated in the introduction to the present specification.

Having thus described my invention, what I claim as new and desire to secure by United States Letters Patent is:

As an article of manufacture, an automobile clothes post for detachable installation in the rear window deck of an automobile; said clothes post comprising, in combination, a single upright metal column having a thin flat convexly contoured wedge-shaped tip at its extreme upper end; a series of garment hooks formed as integral parts of said column with said hook portions each extending outwardly and upwardly and having an upper end portion curved inwardly toward the column whereby said hooks have their point portions inwardly directed and are blunt on the exposed exterior surfaces; the lower portion of said column including a slender tube having an upright cylindrical bore therein; a relatively broad flat base for said column comprising a resilient rubber foot having a vertical hole therethrough, with a recess in the underside of said foot; a conventional screw threaded bolt having its head portion in the recess of said foot, and a threaded shank extending upwardly through the vertical hole therein and into telescoping relation with the cylindrical bore in the aforementioned column; said bolt having a lower clamping nut threaded on its shank and engaging the upper surface of the foot portion to secure the foot on the lower end of the bolt and an upper adjusting nut threaded on the shank of the bolt and adapted to bear against the lower end of the metal column of the device whereby the assembly may be firmly but resiliently clamped between supporting surfaces at the upper and lower ends thereof.

References Cited in the file of this patent

UNITED STATES PATENTS

| | | |
|---|---|---|
| 2,494,318 | Sturk | Jan. 10, 1950 |
| 2,536,293 | Koses | Jan. 2, 1951 |
| 2,550,796 | Francis | May 1, 1951 |
| 2,598,643 | Kaplan | May 27, 1952 |